United States Patent [19]

Stern

[11] Patent Number: 5,483,597

[45] Date of Patent: Jan. 9, 1996

[54] AUTHENTICATION PROCESS FOR AT LEAST ONE IDENTIFICATION DEVICE USING A VERIFICATION DEVICE AND A DEVICE EMBODYING THE PROCESS

[76] Inventor: Jacques Stern, 16, rue de Vandrezanne, 75013 Paris, France

[21] Appl. No.: 175,721

[22] Filed: Dec. 30, 1993

[30] Foreign Application Priority Data

Dec. 30, 1992 [FR] France ................................. 92 15915

[51] Int. Cl.⁶ ........................................................ H04L 9/30
[52] U.S. Cl. ................................................. 380/30; 380/25
[58] Field of Search ......................................... 380/25, 30

[56] References Cited

U.S. PATENT DOCUMENTS

| | | | |
|---|---|---|---|
| 4,218,582 | 8/1980 | Hellman et al. | 380/30 |
| 4,471,164 | 9/1984 | Henry | 380/30 |
| 4,633,036 | 12/1986 | Hellman et al. | 380/30 |
| 4,723,284 | 2/1988 | Munck et al. | 380/25 |
| 4,932,056 | 6/1990 | Shamir | 380/30 |
| 5,054,066 | 10/1991 | Riek et al. | 380/30 |
| 5,142,579 | 8/1992 | Anderson | 380/30 |
| 5,220,606 | 6/1993 | Greenberg | 380/28 |
| 5,295,188 | 3/1994 | Wilson et al. | 380/30 |
| 5,297,206 | 3/1994 | Orton | 380/30 |

OTHER PUBLICATIONS

Advances in Cryptology—Proceedings of Crypto 91, Santa Barbara, 11–15 Aug. 1991, Berlin (DE) pp. 204–212; Y. M. Chee et al, "The Cryptanalysis of a New Public–Key Cryptosystem Based Modular Knapsacks".

*Primary Examiner*—Salvatore Cangialosi
*Attorney, Agent, or Firm*—Oblon, Spivak, McClelland, Maier & Neustadt

[57] ABSTRACT

A a process for the authentication of at least one identification device by a verification device. In this process, authentication is done by a zero knowledge input protocol based on the decoding by syndrome problem. The process consists of setting up a secret vector s with a Hamming weight d, a known matrix M with dimensions n×k and a public vector K such that K=Ms, the production of a random vector y and a random permutation p in the identification device, a commitment on parameters dependent on y and/or p and/or s based on use of the cryptographic hashing function H and the matrix M, an exchange of information concerning y, p, s in order to answer questions asked by the verification device without directly or indirectly revealing s to the verification device, and a verification of validity of the hashed commitments using K and/or previously transmitted information.

38 Claims, 5 Drawing Sheets

AUTHENTICATION PROCESS FOR AT LEAST ONE IDENTIFICATION DEVICE USING A VERIFICATION DEVICE AND A DEVICE EMBODYING THE PROCESS

BACKGROUND OF THE INVENTION

The purpose of this invention is an authentication process for at least one identification device using a verification device, this authentication being carried out using a zero knowledge input protocol based on the decoding by syndrome problem.

Other purposes of this invention are identification and verification devices for embodying the said process. This invention is particularly applicable to protected communications in which two devices exchange data through a channel in which the protection is uncertain. In this case it is essential to have a mutual means of recognition, in other words a means of enabling a verification device to authenticate a User and allow him access to data or services. There are many examples in which this type of protected communication has to be used. One particular example is the case of bank computers used for transaction transfers. In this case the two computers must be certain that they are communicating with each other and not with a pirate entity. We could also mention automatic cash distributors, pay-per-view television decoders, public telephones. In these examples the identification device consists of a portable device such as a smartcard or an electronic key, and the verification device contained in the distributor or decoder must check the validity of the various smartcard or electronic key access means.

DESCRIPTION OF THE PRIOR ART

In this context, authentication methods based on cryptographic techniques with secret codes are frequently used. In the past these methods have been the simplest to implement. With this type of method, the identification device, for example smartcards, and the verification device such as a terminal, a card reader, a decoder or a public telephone, share the same secret key and identification is accomplished by a symmetrical algorithm or a one-way function. The disadvantage of these methods is the fact that the two parts, namely the verification device and the identification device, must mutually and secretly cooperate. This condition is not always satisfied. A pirate entity can purchase the verification device and analyze it to determine its internal structure. Based on this analysis, the pirate entity is technically capable of making efficient identification devices, since the same secret keys are present at both ends of the network, namely in the verification device and in the identification device.

It is recognized that up to the present time protocols with zero knowledge input have provided the highest degree of protection among the various processes that may be used to guard against the disadvantages of known conventional methods.

In summary, identification protocols with zero knowledge input are functionally characterized by the fact that an unlimited number of interactions with the identification device and a complete analysis of the structure of the verification device are not sufficient to rebuild identification devices.

However, zero knowledge input protocols that form an ideal solution to the identification problem do have a major disadvantage. Their electronic construction is somewhat difficult, since it requires a very large number of operations. A description of zero knowledge input identification processes may be found particularly in U.S. Pat. No. 4,748,668 in the name of FIAT et al., and in the European patent application A-0 311 470 in the name of GUILLOU et al.

Efforts have been made recently to develop identification methods with electronics that are easier to make. One such method is described particularly in US patent U.S. Pat. No. 4,932,056 in the name of SHAMIR. This method is known as the PKP method. However this method, which is electronically easier to make than algorithms manipulating large numbers, has the disadvantage of being relatively slow during exchanges between verification and identification devices.

SUMMARY OF THE INVENTION

Therefore the purpose of the present invention is to overcome the disadvantages mentioned above by proposing a new authentication method which is easy to make electronically and in which the verification device can make a fast authentication of the identification device.

Consequently the purpose of this invention is a process for authentication of at least one identification device using a verification device, this authentication being done by zero knowledge input protocol based on the decoding by syndrome problem or the "Modular Knapsack" problem, wherein the process includes the following steps:

to enable dialog between the identification device and the verification device, set up a secret key consisting of at least one vector $s_i$ of dimension n and with Hamming weight d (d<n) and a public key comprising a matrix M of dimensions n×k in which the coefficients are chosen at random and at least one vector $K_i$ such that $K_i = Ms_i$;

in the identification device, produce a random vector y of dimension n and a random permutation p and send a commitment, obtained by applying a cryptographic hash function H to parameters as a function of y, p, s and M, to the verification device;

then, as a function of a random number selected by the verification device and sent to the identification device, reveal some elements as a function of y, p and $s_i$ to the identification device, without revealing $s_i$;

and as a function of the random number, test if the commitments are correct at the verification device using elements received and the public code;

repeat the above operations a number of times that depends on the required protection level knowing that this protection level increases exponentially with the number of loops.

In the above authentication process, a matrix with dimensions n×k is used, this matrix being common to all Users and being built randomly. Each User receives a secret code s which is a word with n bits with a prescribed number d of 1. In this case the system calculates the public code K such that K=Ms.

Alternatively a User may have several secret codes s[1], ..., s[w] associated with public codes K[i]=Ms[i]. It is beneficial if these vectors s[1], ..., s[w] are forced to form an extended simplex code.

The identification process is based mainly on the technical commitment concept. If U is a sequence of binary elements, a commitment for U is the image of U through a certain cryptographic hash function. The commitment will be used as a one-way function.

According to a first embodiment of the authentication process, the first step is:

a) common to the various processes, the identification device reveals its identity and/or its signed keys to the verification device which verifies that the identity in question actually corresponds to the vector $K_i$, then after choosing a random vector y and a random permutation p;

b) the identification device calculates:

$h_1 = H(p, My)$, $h_2 = H(y_p)$, $h_3 = H(y\ XOR\ s)_p$) and sends the commitment $\{h_1, h_2, h_3\}$ to the verification device (where $x_p$ represents the vector x permuted by p and XOR represents the exclusive OR operator);

c) the verification device then selects a number $0 < q < 4$ at random and sends it to the identification device;

d) the identification device then calculates and sends a response r to the verification device defined by:

if q=1 then r={y,p}, if q=2 then r={y XOR s, p}, if q=3 then r={$y_p$, $s_p$};

e) the verification device receives r={U,V} and tests that:

if q=1 then $h_1 = H(V, MU)$ and $h_2 = H(U_V)$, if q=2 then $h_1 = H(V, (MU)\ XOR\ K)$ and $h_3 = H(U_V)$, if q=3 then $h_2 = H(U)$, $h_3 = H(U\ XOR\ V)$ and the Hamming weight of V is d;

f) if the test corresponding to q is satisfied, the verification device considers that the protocol terminated successfully.

According to another embodiment of this invention in which the vector s is replaced by a collection of w vectors s[1], s[2], ..., s[w] forming a simplex code of weight d, after choosing a random vector y and a random permutation p:

b) the identification device calculates $h_1 = H(My, p)$, $h_2 = H(y_p, s[1]_p, \ldots, s[w]_p)$ and sends the commitment $\{h_1, h_2\}$ to the verification device;

c) the verification device selects a binary vector b[1], ..., b[w] at random and sends it to the identification device;

d) the identification device calculates and sends a response z to the verification device defined by:

$z = y_p\ XOR\ s[1]_p b[1]\ XOR\ s[2]_p b[2]\ XOR\ s[3]_p b[3] \ldots XOR\ s[w]_p b[w]$;

e) the verification device selects a bit q at random and sends it to the identification device;

f) the identification device sends a response r defined by:

if q=0 then r={$y_p$, s[1]$_p$, ..., s[w]$_p$}, if q=1 then r={p};

g) the verification device receives a response r={r[0], r[1], ..., r[w]} if q=0 or r={r[0]} if q=1;

h) the verification device tests that:

if q=0 then $h_2 = H(r), z = r[0]\ XOR\ r[1]b[1]\ XOR\ r[2]b[2]\ XOR\ r[3]b[3] \ldots XOR\ r[w]b[w]$ and $\{r[1], r[2], \ldots, r[w]\}$ forms a simplex code;

if q=1 then H(M(depermute(z, r[0])) XOR (K[1]b[1] XOR K[2]b[2] XOR K[3]b[3] ... XOR K[w]b[w], r[0]) = $h_1$ where K[i]=Ms[i];

i) If the test corresponding to q is satisfied, the verification device considers that the protocol terminated successfully.

BRIEF DESCRIPTION OF THE DRAWINGS

Other advantages of this invention will become evident when reading a description of the various embodiments of the process, this description being made with reference to the drawings in the Appendix in which.

DESCRIPTION OF THE PREFERRED EMBODIMENT

Therefore this invention concerns a new authentication process made using a zero knowledge input protocol. The protection provided by the process is based on the decoding by syndrome (DS) problem which may be described as follows: consider a binary matrix M and a binary vector K, the objective is to find a binary vector s with a relatively high or relatively low weight such that Ms=K. "Weight" means the number of bits equal to 1 in the vector concerned. The problem stated above is actually very difficult to solve by calculation means known at the present time if the dimensions of matrix M and the Hamming weight d and s are chosen judiciously. Known algorithms for solving the decoding by syndrome problem as described, for example in J. S Leon's article "A probabilistic algorithm for computing minimum weights of large error-correcting codes" in IEEE TIT, 34(5), pages 1354 to 1359 or in J. Stern's article "A method for finding code words of small weight" Coding Theory & Applications, Computer Science 388 (1989)lecture notes pages 106–113, have a calculation time which increases exponentially with the size of the matrices involved.

Current calculation means cannot calculate s if the dimensions of M are about 500 by 250 and if the value d is close to 50. However given s (taken at random but with a fixed weight) it is possible to calculate K.

In this invention, this one-way property is used so that the verification device that knows K can test that the identification device possesses s without its value being revealed during the interaction.

In order to implement the authentication process according to this invention, an authority chooses and publishes the matrix M composed of coefficients $a_{ij}$ chosen at random. In fact to avoid the need to memorize the entire matrix M, each coefficient $a_{ij}$ may be generated by f(i,j) where f is an arbitrary public pseudo-random function.

The authority also chooses a collection of binary vectors $s_i$, namely $s_1, s_2, \ldots, s_n$, with a relatively low Hamming weight d and distributes them to the various identification devices. The identification device i thus receives $s_i$. Also, all public codes $K_i$ are published where $K_i = Ms_i$.

According to one variant of the embodiment, the authority may also put its signature on $K_i$ values so as to make a closed cryptographic system in which interaction with the authority is necessary in order to validate the public codes, thus creating a system based on the identity of the bearer of the secret code $s_i$.

We will now describe two embodiments specific to the process in this invention.

Figure 3:
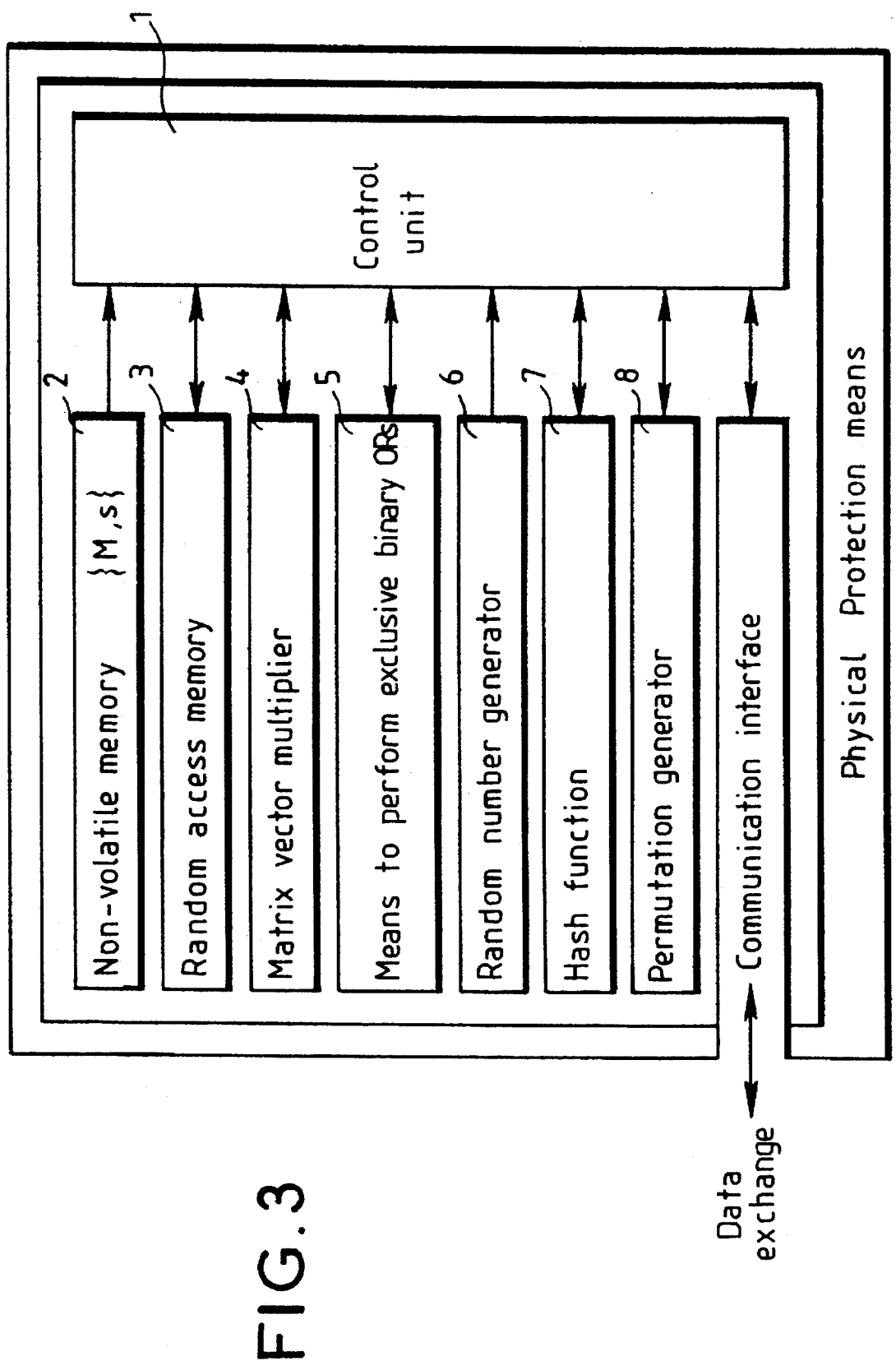
FIG. 3 is a diagram of an identification device making use of this invention.
Figure 4:
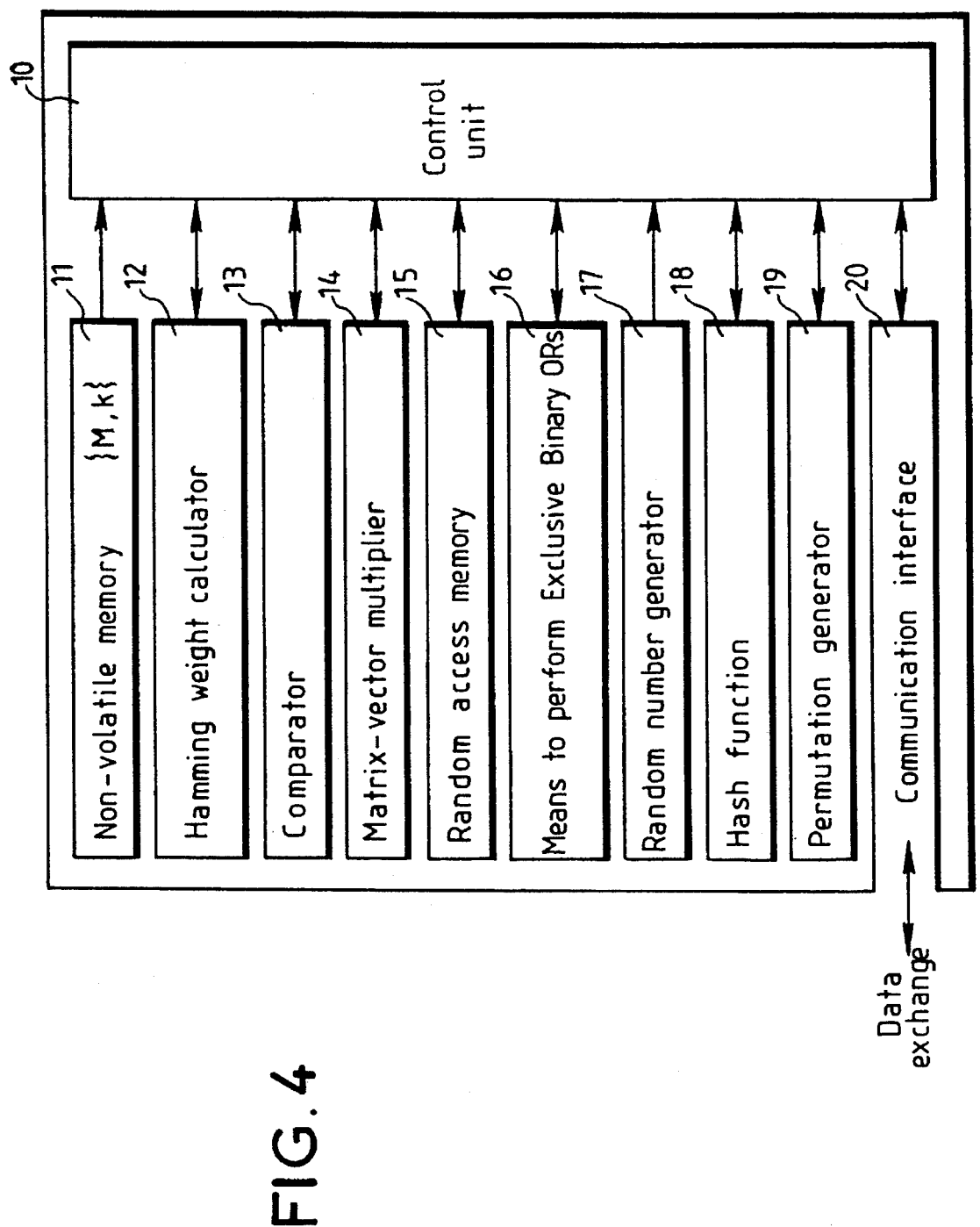
FIG. 4 is a diagram of a verification device making use of this invention.

The first process will be described with reference to FIG. 1 which schematically represents the communication protocol used between an identification device and the verification device to make an authentication. Identification devices that may make use, for example, of smartcards or electronic codes, must be physically tamper-proof. Thus it must be impossible to access the internal memory of a smartcard. However, nothing is assumed about the environment of the verification device. Moreover, as shown in FIGS. 3 and 4 which schematically show an identification device and a verification device, the identification device contains its secret code $s_i$ and the matrix M in non-volatile memory, and similarly the verification device contains all public codes $K_i$ and the matrix M in non-volatile memory. When an identification device wishes to communicate with a verification device, the two devices first execute the following protocol:

a) first the identification device reveals its identity and/or its signed key $K_i$ to the verification device which verifies that the identity in question actually corresponds to $K_i$;

b) the identification device then chooses a random binary vector y and a random permutation p. It then calculates the following elements:

$h_1=H(p,My)$, $h_2=H(y_p)$, $h_3=H((y \text{ XOR } s)_p)$ and sends the commitment $\{h_1, h_2, h_3\}$ to the verification device (where $x_p$ represents the vector x permuted by p and XOR represents the exclusive OR function), c) the verification device then selects a number $0<q<4$ at random and sends it to the identification device, d) the identification device then calculates a response r defined as follows and sends it to the verification device:

if q=1 then $\{y,p\}$, if q=2 then $\{y \text{ XOR } s, p\}$, if q=3 then $\{y_p, s_p\}$;

e) the verification device receives r=$\{U,V\}$ and tests that:

if q=1 then=H (V,MU) and $h_2=H(U_V)$, if q=2 then=H(V, (MU) XOR K) and $h_3=H(U_V)$, if q=3 then $h_2=H(U)$, $h_3=H(U \text{ XOR } V)$ and the Hamming weight of V is d;

f) if the test corresponding to q is satisfied, the verification device considers that the protocol terminated successfully.

If the test is not correct, the identification device is rejected.

When the device is accepted, a command pulse is sent on the input/output interface of the protected system which allows the subsequent transaction to start. All the above operations are symbolized in FIG. 1, in which the left part of the figure represents the various operations performed by the identification device, and the right part represents the various operations performed by the verification device, the arrows representing information transferred from one device to the other.

In order to increase the security of the process, the two identification of verification devices repeat the above steps several times, namely t times, the verification device authenticating the identification device only if all protocol sessions were completed successfully. Preferably choose t such that $0<t<60$.

The basic process described above may be modified in a number of ways, particularly to simplify electronic construction and reduce calculation times. It is thus possible to transmit the vector My in plain text and to redefine $H_1=H(p)$ by modifying the corresponding tests. In another variant, the verification device and/or the identification device may make a partial test on a sub-set of vector coordinates and thus perform the calculations more quickly. In this case some steps of the process will be modified as described below.

Step b may be modified as follows:

after choosing a random vector y and a random permutation p, b) the identification device calculates $h_1=H(p)$, $h_2=H(y_p)$, $h_3=H((y \text{ XOR } s)_p)$ and sends the commitment $\{h_1, h_2, h_3\}$ to the verification device;

c) the verification device selects a list of mutually discontinuous numbers $G=\{g_1, \ldots g_f\}$ at random such that $1<g_i<k$ and sends it to the identification device;

d) the identification device calculates only the f bits of My whose locations are indicated by G and sends the vector Z thus obtained to the verification device.

In this case step e is also modified as described below:

e) the verification device receives r=$\{U,V\}$ and checks that:

if q=1 then $h_1=H(V)$, $h_2=H(UV)$ and Extract(MU,G) XOR Z=0 where Extract(x, G) represents the projection vector obtained by choosing only the bits in x indicated by G, if q=2 then $h_1=H(V)$, $h_3=H(U_V)$ and Extract(MU XOR K,G) XOR Z=0, if q=3 then $h_2=H(U)$, $h_3=H(U \text{ XOR } V)$ and the Hamming weight of V is d.

According to another variant to the process, step b may be modified as follows:

b) after choosing a random vector y and a random permutation p, the identification device calculates $h_1=H(p)$, $h_2=H(y_p)$, $h_3=H((y \text{ XOR } s)_p)$ and sends the commitment $\{h_1, h_2, h_3\}$ to the verification device;

c) the identification device calculates Q=My and sends the vector Q thus obtained to the verification device;

d) the verification device selects a list of mutually discontinuous numbers $G=\{g_1, \ldots, g_f\}$ at random such that $1<g_i<k$ and calculates the vector Z=Extract(Q,G).

Step e is then modified as follows:

e) the verification device receives r=$\{U,V\}$ and checks that:

if q=1 then $h_1=H(V)$, $h_2=H(U_V)$ and Extract(MU,G) XOR Z=0, if q=2 then $h_1=H(V)$, $h_3=H(U_V)$ and Extract(MU XOR K,G) XOR Z=0, if q=3 then $h_2=H(U)$, $h_3=H(U \text{ XOR } V)$ and the Hamming weight of V is d.

Another embodiment of the authentication process is now described with reference to FIG. 2. This second embodiment requires more calculations than the previous embodiment, but the probability of success by an illegal entity decreases more quickly. In this case, vector $s_i$ is replaced by set of vectors $s[1], \ldots, s[w]$ forming an extended simplex code. Moreover the vector $K_i$ is replaced by a set of vectors $K[1], \ldots, K[w]$ such that $M(s[i])=K[i]$.

Figure 1:
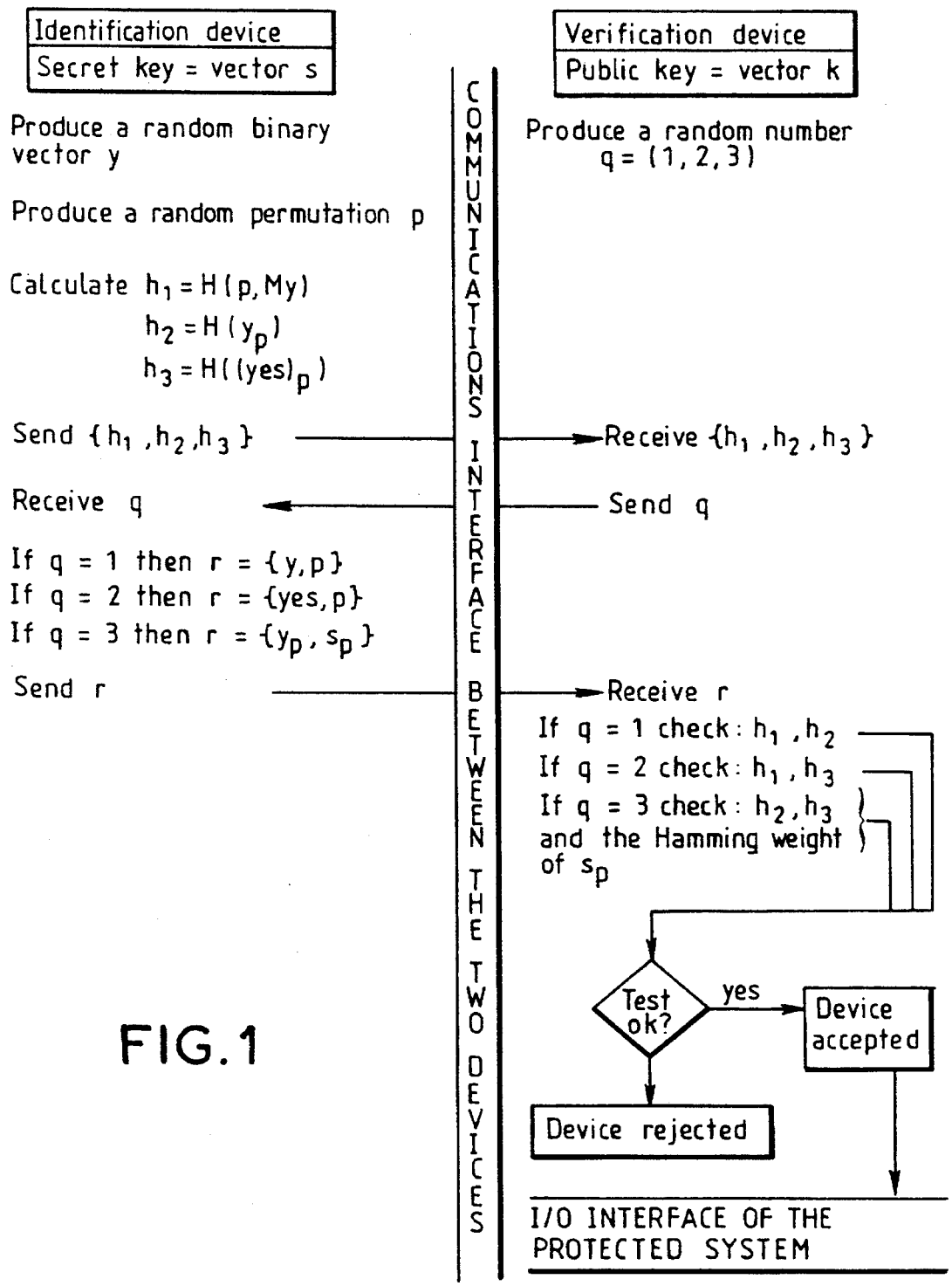
FIG. 1 is a schematic explaining a first embodiment of the authentication process according to this invention.
Figure 2:
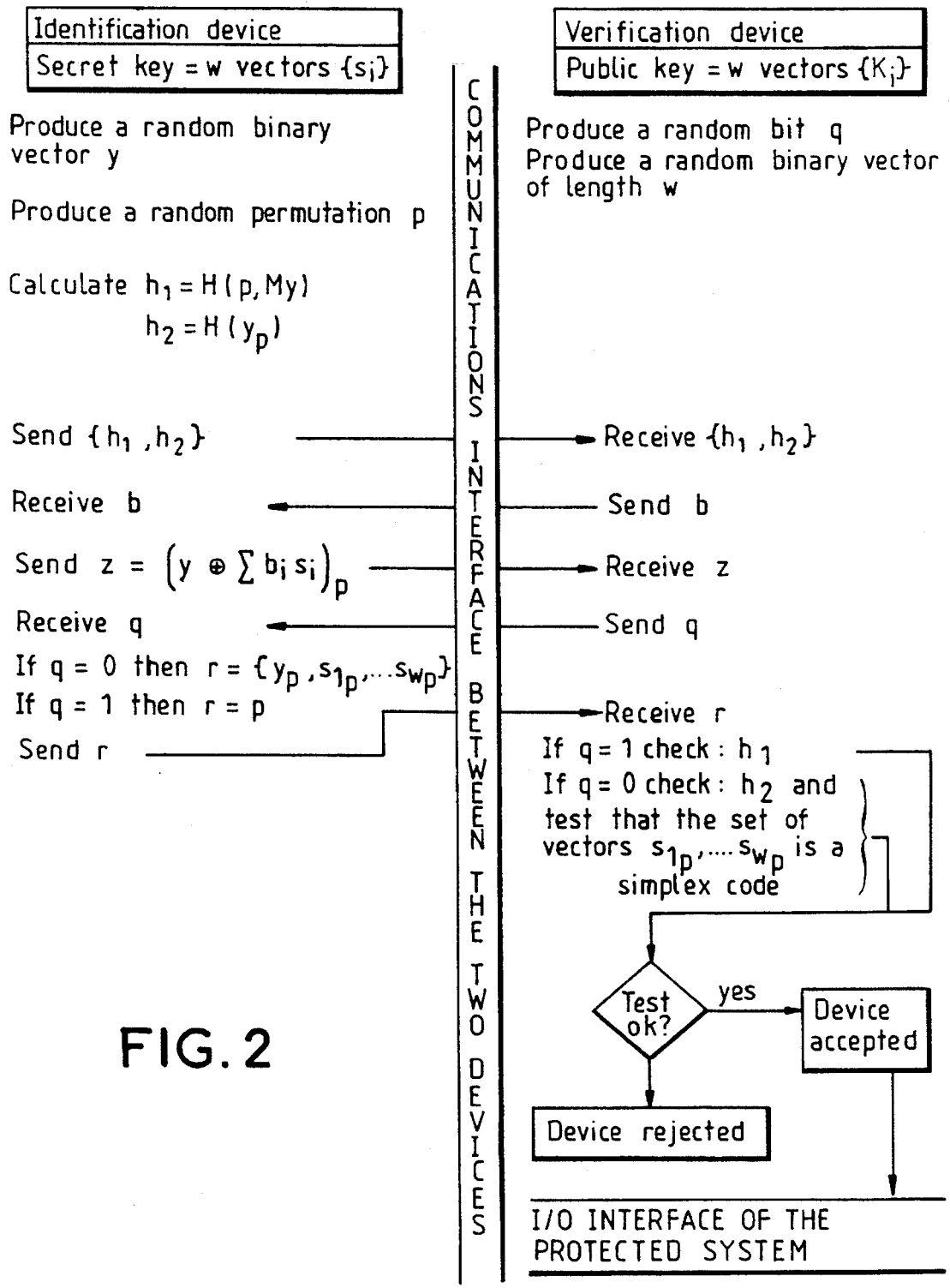
FIG. 2 is a schematic showing a second embodiment of the process according to this invention.

Therefore this embodiment includes the following steps, symbolized in FIG. 2 using exactly the same symbols as are used in FIG. 1:

a) the identification device chooses a random vector y and a random permutation p, then calculates $h_1=H(My, p)$, $h_2=H(y_p, s[1]_p, \ldots, s[w]_p)$ and sends the commitment $\{h_1, h_2\}$ to the verification device, b) the verification device selects a binary vector $b[1], \ldots, b[w]$ at random and sends it to the identification device, c) the identification device calculates and sends a response z defined as follows to the verification device:

$$z=y_p \text{ XOR } s[1]_p b[1] \text{ XOR } s[2]_p b[2] \text{ XOR } s[3]_p b[3] \ldots \text{ XOR } s[w]_p b[w];$$

d) the verification device selects a bit q at random and sends it to the identification device, e) the identification device sends a reply r defined by:

if q=0 then r=$\{y_p, s[1]_p, \ldots, s[w]_p\}$, if q=1 then r=$\{p\}$;

f) the verification device receives a reply r=$\{r[0], r[1], \ldots, r[w]\}$if q=0 or r=$\{r[0]\}$ if q=1;

g) the verification device tests that:
   if $q=0$ then $h_2=H(r), z=r[0]$ XOR $r[1]b[1]$ XOR $r[2]b[2]$ XOR $r[3]b[3] \ldots$ XOR $r[w]b[w]$ and $\{r[1], r[2], \ldots, r[w]\}$ forms a simplex code,
   if $q=1$ then $H(M(\text{depermute}(z, r[0]))$ XOR $(K[1]b[1]$ XOR $K[2]b[2]$ XOR $K[3]b[3] \ldots$ XOR $K[w]b[w]), r[0])=h_1$;

h) if the test corresponding to q is satisfied, this verification device considers that the protocol terminated successfully.

This process may also be modified and adapted to prevent depermutation of the vector z, and to make a simplified verification on a sub-set of vector coordinates as described above. In this case the process may for example include the following steps:

a) the identification device chooses a random vector y and a random permutation p and then calculates:

$h_1=H(p)$, $h_2=H(y_p, s[1]_p, s[w]_p)$ and sends the commitment $\{h_1, {}_2\}$ and the vector $h_0=My$ to the verification device;

b) the verification device selects a binary vector $b[1], \ldots, b[w]$ at random and sends it to the identification device, c) the identification device calculates and sends a reply z defined as follows to the verification device:

$$z=y_p \text{XOR } s[1]_p b[1] \text{XOR } s[2]_p b[2] \text{XOR } s[3]_p b[3] \ldots \text{XOR } s[w]_p b[w];$$

d) the verification device selects a bit q at random and sends it to the identification device, e) the identification device sends a reply r defined as follows:
   if $q=0$ then $r=\{y_p, s[1]_p, \ldots, s[w]_p\}$,
   if $q=1$ then $r=\{p\}$;

f) the verification device receives a reply $r=\{r[0], r[1], \ldots, r[w]\}$ if $q=0$ or $r=\{r[0]\}$ if $q=1$;

g) the verification device tests that:
   if $q=0$ then $h_2=H(r), z=r[0]$ XOR $r[1]b[1]$ XOR $r[2]b[2]$ XOR $r[3]b[3] \ldots$ XOR $r[w]b[w]$ and $\{r[1], r[2], \ldots, r[w]\}$ forms a simplex code,
   if $q=1$ then $h_1=H(r_{[0]})$ and $(h_0)r[0]$ XOR $(K[1]b[1]$ XOR $K[2]b[2]$ XOR $K[3]b[3] \ldots$ XOR $K[w]b[w])r[0]=z$.

If the corresponding test was satisfied, the verification device considers that the protocol terminated successfully.

As in the case of the first embodiment, the protocol described above may repeated t times, the verification device only authenticating the identification device if all protocol sessions terminated successfully.

Secondly, security of the two methods described above depends on the size of the various parameters, and particularly on the size of d, n, k, and t. It is obvious for the professional of the art that the choice of t can easily be changed during operation, by the two devices communicating together as a function of the context. The d, n and k parameters are system parameters and their values are fixed initially and are more difficult to change.

Thus preferably the d, n, k parameters will be chosen significantly below the Warshamov-Gilbert limit giving a theoretical limiting value for the minimum weight d of a random code (n,k), namely: $d=nH_2(k/n)$ where $H_2(x)$ is the entropy function $H_2(x)=-x\log_2(x)-(1-x)\log_2(1-x)$. In this case d is chosen such that:

$$d=(k-n)\log_2(1-(k/n))-k \log_2 (k/n)$$

or $$d=(n-(k-n)\log_2 (1-(k/n))+k \log_2 (k/n).$$

It is also convenient to combine the restriction defined by the Warshamov-Gilbert limit with a relation such as $2k=n$ which relates the values of N and k.

Using the above relations, preferably $d=0.11$ n or $d=0.89$ n, the pairs n and k can be equal to one of the following values:

$\{n=384, k=196\}$ or $\{n=512, k=256\}$ or $\{n=1024, k=512\}$ or $\{n=768, k=384\}$.

According to one variant of the embodiment which may be used in all methods described above, the hash function is replaced by an encryption function in which the message to be hashed acts as the key and/or messages to be encrypted and where the check on the truth of the hashed message consists of unmasking the message which was hashed and/or the encryption key. The following publications may be consulted on this subject:

Ivan Damgaard, Crypto'89, "Design principles for hash functions";

Naor et al. "One-way hash functions and their cryptographic applications", Proceedings of the 21st annual ACM symposium on theory of computing, Seattle, Wash., May 15–17, 1989, pp 33–43;

Matyas, "Generating strong one-way functions with cryptographic algorithm", IBM Technical disclosure bulletin. vol. 27, N°10A, March 1985, pp.5658–5659.

For a process based on the "Modular Knapsack", the choice of the vector y and all calculations are carried out modulo m and the XOR operation is replaced by a modulo m addition or subtraction, tests on the weight being replaced by the verification that all coordinates of the vector are equal to 0 or 1, and that the weight of this vector is constant, the relation between n, k and m being: $n \sim k \ln(m)/\ln 2$ and $n-k>64$. m is then chosen among the numbers 2, 3, 5, 7 or $2^c$ where c is a small integer number and the $\{n, k, m\}$ sets may be equal to one of the following values:

$\{196, 128, 3\}$ or $\{384, 256, 3\}$ or $\{128, 64, 5\}$ or $\{192, 96, 5\}$.

In many cases, it is important to have a means of deducing s from the identity "ID" of the bearer of the identification device. For example this can avoid the need to save public codes $K_i$ in verification devices and to update a public keys dictionary whenever a new User joins the system.

This can be done by the authority choosing an extended simplex code $\text{sigma}_1, \ldots, \text{sigma}_u$ as a parameter, once and for all.

To record a User identity "ID", the value ID is hashed by a uni-directional public function (for example the hash function H) and a binary value $e_1, \ldots, e_u$ is obtained. We calculate:

$$s_{ID} = \sum_{i=1}^{u} e_i \text{sigma}_i$$

We publish $K_1=M(\text{sigma}_1), \ldots, K_u=M(\text{sigma})_u$ and give $s_{ID}$ to the User ID.

The verification devices can calculate:

$$K_{ID} = \sum_{i=1}^{u} e_i K_i$$

where vector $e_1, \ldots, e_u$ is given by hashing ID and check that the identification device possesses $s_{ID}$.

In order to obtain a sufficient degree of security, it is essential that u>40, which at first sight implies excessively large simplex codes. In practice it is easy to obtain reasonable sizes by choosing a collection of L simplex codes with small dimensions (for example d=64, dim=7, n=580, k=290, L=8) and calculating a collection of L secret codes $s[1]_{ID}$, $s[2]_{ID}$, ..., $s[L]_{ID}$ for each User, obtained as follows.

Choose L simplex codes of dimension dim once and for all:

sigma $[1]_1$, ... sigma$[1]_{dim}$ sigma $[2]_1$, ... sigma$[2]_{dim}$ sigma $[L]_1$, ... sigma$[L]_{dim}$ give to each identification device the complete collection of public codes $K[i]_j$=M (sigma $[i]_j$) for i=1, ... L and j=1, ... dim For each User:
1. Calculate: H(ID)=$e_1$, ... $e_u$
2. Share the vector e into L segments e[1], ... e[L] each containing dim bits;
3. For i=1 to L calculate:

$$s[i]_{ID} = \sum_{j=1}^{dim} e[i]_j \text{sigma}[i]_j$$

4. Give $s[1]_{ID}$, $s[2]_{ID}$, ..., $s[I]_{ID}$ to the User.

The various $s[i]_{ID}$ values are used serially (using $s[i]_{ID}$ values sequentially in successive loops) or in parallel as illustrated by the following protocol:

a) the identification device reveals its identity ID to the verification device;

b) the verification device calculates $K[1]_{ID}$, $K[2]_{ID}$, ..., $K[L]_{ID}$ c) the identification device chooses L vectors y[1], ..., y[L] and L permutations p[1], ..., p[L], calculates $h_1$=H({p[i]}, {My[i]}), $h_2$=H({y[i]$_p$[i]}), $h_3$= H ({y[i] XOR s[i]$_{[i]}$}) and sends the commitment {$h_1$, $h_2$, $h_3$} to the verification device;

d) the verification device selects a number 0<q<4 at random and sends it to the identification device;

e) the identification device calculates and sends to the verification device a reply r defined as follows:

if q=1 then r={{y[i]}, {p[i]}}, if q=2 then r={{y[i] XOR s[i]}, {p[i]}}, if q=3 then r={{y[i]$_{p[i]}$}, {s[i]$_{p[i]}$}};

f) the verification device receives r={U, V} and tests that:

if q=1 then $h_1$=H ({V[i]}, {MU[i]}) and $h_2$=H({U[i]$_{V[i]}$}), if q=2 then $h_1$=H ({V[i]}, ({MU[i]} XOR K[i]}) and $h_3$= H({U[i]$_{V[i]}$}), if q=3 then $h_2$=H ({U[i]}, $h_3$=H({U[i] XOR V[i]}) and the weight of V[i] is d.

g) If the test corresponding to q is satisfied, the verification device considers that the protocol terminated successfully;

h) the two devices repeat steps a) to f) t times.

In the parallel version, the protocol is as follows:

a) the identifier reveals his identity ID to the verifier b) the verifier calculates $K[1]_{ID}$,$K[2]_{ID}$, ..., $K[L]_{ID}$ c) the identifier chooses L vectors y[1], ..., y[L] and L permutations p[1], ..., p[L], calculates $h_1$={H(p[i], My[i])}, $h_2$={H(y[i]$_p$[i])}, $h_3$= {H((y[i]XOR s[i]$_p$[i])} and sends the commitment {$h_1$, $h_2$, $h_3$} to the verifier.

d) the verifier selects L random numbers q[1], ..., q[L] where 0<q(i)<4 and sends them to the identifier e) the identifier calculates and sends to the verifier L responses r[1], ..., r[L] defined as follows:

if q[i]=1 then r[i]={y[i], p[i]}, if q[i]=2 then r[i]={y[i]XOR s(i), p[i]}, if q[i]=3 then r[i]={y[i]$_{p[i]}$s(i)$_{p[i]}$};

f) the verifier receives {r[i]} and checks the commitments in a manner that will easily be understood by the expert.

Another method of relating ID to s is as follows:

input t secrets with weight at in which the bits equal to 1 are distributed over 2 at positions, namely s[1], s[2], ..., s[t], and publish Ms[i] for i=1, ..., t.

In this case a code is generated using the following process. It is easy, particularly using partial triangulation, to find a word s such that:

$$s = \sum_{i=1}^{t} x[i]s[i] \quad \text{and}$$

$$Ms = \sum_{i=1}^{t} e_i Ms[i] \quad \text{and}$$

the weight of s is approximately ta-t/2.

The choice of dimensions in this system is typically governed by the following relations: 0.11 n=ta−t/2, 2k=n and 2atem>56 where 2a−2a $H_2(\epsilon)$~1.

Typically for t=56 we have: d=95, n=863, k=432. It will be obvious to the professional of the art that other combinations are possible.

We will now briefly describe a schematic method for making an identification device, which could be for example a smartcard, with reference to FIG. 3. This identification device therefore comprises a control unit 1, a read only non-volatile memory 2 which may contain, for example, the matrix M or a function used to obtain the coefficients of the matrix M as described above, and the secret code $s_i$ of the identification device itself. It also contains a random access memory 3, a vector/matrix multiplier which can be made as will be described with reference to FIG. 5, a means 5 for making exclusive binary ORs, a random number generator 6, a hash function 7 and a permutation generator 8, all these elements being physically protected. It also has a communication interface used for data exchange between the verification device and the identification device control unit. The random number generator may be made by using a digitized white noise source which may be produced, for example, by a zener diode reverse polarized in the "elbow" zone, or could also include a pseudo-random number generator such as that described in American patent U.S. Pat. No. 4,817,145 in the name of GUNTER or U.S. Pat. No. 4,649,419 in the name of ARAGON. Also, the permutation generator 8 is capable of permuting binary vectors, for example using the method described in the article entitled "On the generation of permutation" by David Naccache in the South African Computer Journal, n°2, 1990, pages 12 to 16.

The hash function may be made using an MD4 hash function presented by RIVEST at Crypto 90, FFT-Hash II suitably iterated presented by SCHNOR at Eurocrypt 92, or by the DES encryption algorithm.

The verification device as shown in FIG. 4 also comprises a control unit 10, this control unit 10 being connected to a ROM type non-volatile memory 11 which contains the matrix M and the public key K, a Hamming weight calculator 12, a comparator 13, a matrix-vector multiplier 14, a random access memory 15, means 16 for performing binary exclusive ORs identical to means 5 in the identification device, random number generator 17 as described above, a hash function 18 identical to the hash function 7 and a permutation generator 19. It also comprises a communication interfaces 20 connected to the control unit 10 and used to manage communications between the verification device and the various identification devices.

Figure 5:
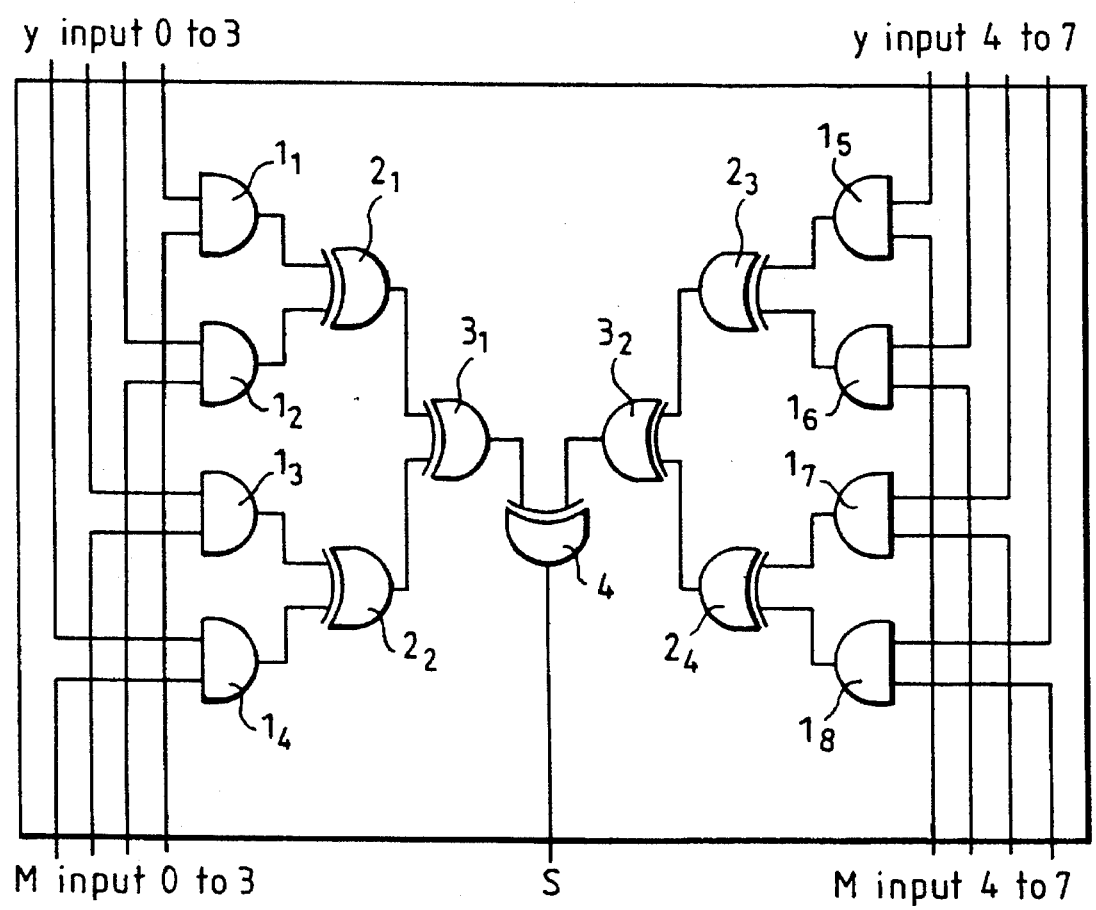
FIG. 5 is an electronic diagram showing an example of construction of a matrix/vector multiplier conform with this invention.

We will now describe a method of providing the matrix and vector multiplication function, with reference to FIG. 5. This simplified construction method may be used with an 8 bit vector y. As shown in FIG. 5 for a matrix multiplier M capable of multiplying an 8 bit vector y by a matrix of corresponding dimensions, this multiplier consists of eight AND gates $1_1, 1_2, 1_3, 1_4, 1_5, 1_6, 1_7, 1_8$. Each AND gate receives a bit from vector y and a bit from the current line of matrix M on each input. The outputs of the AND gate feed a triangular network of exclusive OR gates $2_1, 2_2, 2_3, 2_4, 3_1, 3_2, 4$ in order to obtain the bit corresponding to the scalar product of y and the current line of the matrix M at the circuit output. More specifically, the outputs from gates $1_1, 1_2$ are sent to the input of the exclusive OR gate $2_1$ and the outputs from gates $1_3, 1_4$ are applied to the input of the exclusive OR gate $2_2$ and the outputs from these two exclusive OR gates are applied to the input of the exclusive OR gate $3_1$. In exactly the same way, the outputs from gates $1_5, 1_6$ are applied to the input of the exclusive OR gate $2_3$ and the outputs from gates $1_7, 1_8$ are applied to the input of the exclusive OR gate $2_4$, the outputs from these two exclusive OR gates being applied to the input of the exclusive OR gate $3_2$. The outputs of the exclusive OR gates $3_1, 3_2$ are applied to the input of the exclusive OR gate 4, the output S of which is the scalar product of y by the current line of the matrix M.

What is claimed is

1. A method of authenticating the identity of at least one identification device by a verification device, said method comprising the steps of:

(a) generating an electronic secret key signal representing a secret key having at least one vector $s_i$ of dimension n and Hamming weight d, where d, i, and n are integers and d<n;

(b) generating an electronic public key signal representing a public key having a matrix M with dimensions n×k the coefficients of which are chosen at random, where k is an integer;

(c) generating an electronic vector signal representing a vector $K_i$ such that $K_i = M \cdot s_i$;

(d) generating, via said at least one identification device, a first electronic signal representing a random vector y of dimension n and a second electronic signal representing a random permutation p;

(e) applying an electronic signal representing a cryptographic hash function H to said second electronic signal, said first electronic signal, said electronic secret key signal, and said electronic public key signal to generate third electronic signals representing commitment values $h_1$, $h_2$, and $h_3$;

(f) sending said third electronic signals to said verification device;

(g) generating, via said verification device, a fourth electronic signal representing a random number q and sending said fourth electronic signal to said at least one identification device;

(h) generating, via said at least one identification device, a fifth electronic signal representing reply r in accordance with said fourth electronic signal received from said verification device;

(i) receiving and testing, via said verification device, said reply to verify the identity of said at least one identification device; and (j) repeating steps (a)–(i) a plurality of times in accordance with a predetermined security level.

2. The method according to claim 1, wherein said at least one vector $s_i$ is a binary vector.

3. The method according to claim 1, wherein:

said matrix M is binary matrix;

said commitment values are computed as follows:

$h_1 = H(p, M \cdot y)$, $h_2 = H(y_p)$, and $h_3 = H((y \text{ XOR } s_i)_p)$, where $y_p$ represents the vector y permuted by p, and XOR represents the exclusive OR function;

said random number q is an integer such that 0<q<4;

said testing carried out in step (i) is carried out as follows:
    if q=1, then said identification device generates said fifth electronic signal as a function of said first and second electronic signals,
    if q=2, then said identification device generates said fifth electronic signal as a function of (y XOR $s_i$) and said second electronic signal, and
    if q=3, then said identification device generates said fifth electronic signal as a function of $Y_p$ and $s_i$; and
    said verification device receives said reply r={U,V} and tests that:
    if q=1, then $h_1 = H(V, M \cdot U)$ and $h_2 = H U_V$),
    if q=2, then $h_2 = H(V, (M \cdot U) \text{ XOR } K_i)$ and $h_3 = H(U_V)$, and
    if q=3, then $h_2 = H(U)$, $h_3 = H(U \text{ XOR } V)$ and the Hamming weight of V is d as indication of a successful verification of the identity of said at least one identification device.

4. A method according to claim 1, wherein:

said matrix M is a binary matrix;

said commitment values are calculated as follows:

$h_1 = H(p)$, $h_2 = H(y_p)$, and $h_3 = H((y \text{ XOR } s_i)_p)$;

where $y_p$ represents the vector y permuted by p, and XOR represents the exclusive OR function;

said verification device generates a sixth electronic signal representing a list of randomly selected mutually discontinuous number $G = \{g_1, \ldots g_f\}$ such that $1 < g_i < k$ and sends said sixth electronic signal to said at least one identification device, where f is an integer;

said at least one identification device calculates f bits of $M \cdot y$ at locations indicated by G to generate an electronic signal representing a vector Z, and sends said vector Z to said verification device;

said testing carried out in step (i) is carried out as follows:
    if q=1, then said identification device generates said fifth electronic signal as a function of said first and second electronic signals,
    if q=2, then said identification device generates said fifth electronic signal as a function of (y XOR $s_i$) and said second electronic signal, and
    if q=3, then said identification device generates said fifth electronic signal as a function of $Y_p$ and $s_i$; and said verification device receives said reply r={U,V} and tests that:
- if q=1, then $h_1$=H(V) and $h_2$=H(U·V) and Extract (M·U·G) XOR Z=0 where Extract(x, G) represents the projection vector obtained by choosing in x only the bits indicated by G,
- if q=2, then $h_1$=H(V) and $h_3$=H($U_v$) and Extract (M·U XOR $K_i$, G) XOR Z=0, and
- if q=3 then $h_2$=H(U), $h_3$=H(U XOR V) and the Hamming weight of V is d as indication of a successful verification of the identity of said at least one identification device.

5. The method according to claim 1, wherein:

said matrix M is a binary matrix;

said commitment values are calculated as follows:

$h_1$=H(p), $h_2$=H($y_p$), and $h_3$=H ((y XOR $s_i$)$_p$, where $y_p$ represents the vector y permuted by p, and XOR represents the exclusive OR function;

said at least one identification device an electronic signal representing a vector Q=M·y and sends said electronic signal to said verification device;

said verification device generates a sixth electronic signal representing a list of randomly selected mutually discontinuous numbers G={$g_1$, . . . ,$g_f$} such that 1<$g_i$<k and generates an electronic signal representing a vector Z=Extract(Q,G), where f is an integer and Extract (Q,G) represents the projection vector obtained by choosing in Q only the bits indicated by G;

said testing carried out in step (i) is carried out as follows:
- if q=1, then said identification device generates said fifth electronic signal as a function of said first and second electronic signals,
- if q=2, then said identification device generates said fifth electronic signal as a function of (y XOR $s_i$) and said second electronic signal, and
- if q=3, then identification device generates said fifth electronic signal as a function of $Y_p$ and $s_i$; and said verification device receives said reply r={U,V} and tests that:
- if q=1, then $h_1$=H (V), $h_2$=H ($U_v$) and Extract (MUG) XOR Z=0,
- if q=2, then $h_1$=H(V), $h_3$=H($U_v$) and Extract (MU XOR $K_i$, G) XOR Z=0, and
- if q=3, then $h_2$=H(U), $h_3$=H(U XOR V) and the Hamming weight of V is d as indication of a successful verification of the identity of said at least one identification device.

6. The method according to claim 1, wherein:

said coefficients of said matrix M and coefficients of said random vector y are integers less than an integer m;

said commitment values are computed as follows:

$h_1$=H(p,M·y), $h_2$=H ($Y_p$), and $h_3$=H (y $MOD_m$ $S_i$)$_p$), where $y_p$ represents the vector y permuted by p, and $MOD_m$ represents addition modulo m;

said random number 1 is an integer such that 0<1<4;

said testing carried out in step (i) is carried out as follows:
- if q=1, then said identification device said fifth electronic signal as a function of said first and second electronic signals,
- if q=2, then said identification device generates said fifth electronic signal as a function of (y $MOD_m$ $S_i$) and said second electronic signal, and
- if q=3, then said identification device generates said fifth electronic signal as a function of $Y_p$ and $S_i$; and said verification device receives said reply r={U,V} and tests that:
- if q=1, then $h_1$=H (V,M·U) and $h_2$=H $U_v$)
- if q=2, then $h_1$=H(V, (M·U) $MOD_m K_i$) and $H_3$= H($U_v$), and
- if q=3, then $h_2$=H(U), $h_3$=H(U $MOD_m$ V) and the vector $S_i$ consists of zeros and/or ones as indication of a successful verification of the identity of said at least one identification device.

7. A method according to claim 1, wherein:

said coefficients of said matrix M and coefficients of said random vector y are integers less than an integer m;

said commitment values are calculated as follows:

$h_1$=H (p), $h_2$=H ($Y_p$)

and $h_3$=H ((y $MOD_m$ $S_i$)$_p$);

where $y_p$ represents the vector y permuted by p, and $MOD_m$ represents addition modulo m;

said verification device generates a sixth electronic signal representing a list of randomly selected mutually discontinuous numbers G={$g_1$, . . . $g_f$} such that 1<$g_i$<k and sends said sixth electronic signal to said at least one identification device, where f is an integer;

said at least one identification device calculates f values of M·y at locations indicated by G to generate an electronic signal representing a vector Z, and sends said electronic signal to said verification device;

said testing carried out in step (1) is carried out as follows:
- if q=1, then said identification device generates said fifth electronic signal as a function of said first and second electronic signals,
- if q=2, then said identification device generates said fifth electronic signal as a function by (y $MOD_m$ $S_i$) and said second electronic signal and
- if q=3, then said identification device generates said fifth electronic signal as a function of $Y_p$ and $S_i$; and said verification device receives said reply r={U,V} and tests that:
- if q=1, then $h_1$=H(V) and $h_2$=H(U·V) and Extract (M·U·G) $MOD_m$ Z=0 where Extract (x, G) represents the projection vector obtained by choosing in x only the values indicated by G,
- if q=2, then $h_1$=H(V) and $h_3$=H($U_v$) and Extract (M·U $MOD_m$ $K_i$, G) $MOD_m$ Z=0, and
- if q=3 then $h_2$=H(U), $h_3$=H(U $MOD_m$ V) and the vector $S_i$ consists of zeroes and/or ones as indication of a successful verification of the identity of said at least one identification device.

8. The method according to claim 1, wherein:

said coefficients of said matrix M and coefficients of said random vector y are integer less than an integer m;

said commitment values are calculated as follows:

$$h_1 = H(p),$$

$$h_2 = H(Y_p),$$

and $$h_3 = H((y \text{ MOD}_m S_i)p,$$

where $y_p$ represents the vector y permuted by p, and $\text{MOD}_m$ represents addition modulo m;

said at least one identification device calculates an electronic signal representing a vector Q=M·y and sends said electronic signal to said verification device;

said verification device generates a sixth electronic signal representing a list of randomly selected mutually discontinuous numbers $G=\{g_1, \ldots, g_f\}$ such that $1 < g_i < k$ and generates an electronic signal representing a vector Z=Extract (Q,G), where f is an integer and Extract (Q,G) represents the projection vector obtained by choosing in Q only the values indicated by G;

said testing carried out in step (i) is carried out as follows:

if q=1, then said identification device generates said fifth electronic signal as a function of said first and second electronic signals, if q=2, then said identification device generates said fifth electronic signal as a function of (y $\text{MOD}_m S_i$) and said second electronic signal, and if q=3, then identification device generates said fifth electronic signal as a function of $Y_p$ and $S_i$; and said verification device receives said reply r={U,V} and tests that:

if q=1, then $h_1 = H(V)$, $h_2 = H(U_V)$ and Extract (MUG) $\text{MOD}_m Z = 0$, if q=2, then $h_1 = H(V)$, $h_3 = H(U_V)$ and Extract (MU $\text{MOD}_m K_i$, G) $\text{MOD}_m Z = 0$, and if q=3, then $h_2 = H(U)$, $h_3 = H(U \text{ MOD}_m V)$ and the vector $S_i$ consists of zeros and/or ones as indication of a successful verification of the identity of said at least one identification device.

9. A method of authenticating the identity of at least one identification device by a verification device, said method comprising the steps of:

(a) generating an electronic secret key signal representing a secret key having a set of vectors s[1], ... s[w] of dimension n and Hamming weight d, forming an extended simplex code, where d, w, i, and n are integers and d<n;

(b) generating an electronic public key signal representing a public key having a binary matrix M with dimensions n×k the coefficients of which are chosen at random, where k is an integer;

(c) generating an electronic vector signal representing a set of vectors K[1], ..., K[w] such that M·[s(i)]=K[i], where i is an integer;

(d) generating, via said at least one identification device, a first electronic signal representing a random vector y of dimension n and a second electronic signal representing a random permutation p;

(e) applying an electronic signal representing a cryptographic hash function H to said second electronic signal, said first electronic signal, said electronic secret key signal, and said electronic public key signal to generate third electronic signals representing commitment values $h_1$ and $h_2$;

(f) sending said third electronic signals to said verification device;

(g) generating, via said verification device, a fourth electronic signal representing a random number q and sending said fourth electronic signal to said at least one identification device;

(h) generating, via said at least one identification device, a fifth electronic signal representing a reply r in accordance with said fourth electronic signal received from said verification device;

(i) receiving and testing, via said verification device, said reply to verify the identity of said at least one identification device; and (j) repeating steps (a)–(i) a plurality of times in accordance with a predetermined security level.

10. The method according to claim 9, wherein:

said commitment values are computed as follows:

$$h_1 = H(M \cdot y, p),$$

and $$h_2 = H(y_p, s[1]_p, \ldots, s[w]_p),$$

where $y_p$ represents the vector y permuted by p, and XOR represents the exclusive OR function;

said verification device generates a sixth electronic signal representing a randomly selected binary vector b[1] ..., b[w] and sends said sixth electronic signal to said at least one identification device;

said at least one identification device generates an electronic signal representing a response z as follows:

$$z = y_p \text{XOR } s[1]_p b[1] \text{XOR } s[2]_p b[2] \text{XOR } s[3]_p b3] \ldots \text{XOR } s[w]_p b[w]$$

and sends said electronic signal to said verification device;

said random number q is equal to 0 or 1;

said testing carried out in step (i) is carried out as follows:

if q=0, then said identification device generates said fifth electronic signal as a function of vector $y_p$ and vectors $s[1]_p, \ldots, s[w]_p$, and if q=1, then said identification device generates said fifth electronic signal as a function of said second electronic signal, said verification device receives said response r= {r[0], r[1], ..., r[w]} if q=0 or r={r[0]} if q=1 and tests that:

if q=0, then $h_2 = H(r), z = r[0] \text{XOR } r[1]b[1] \text{XOR } r[2]b[2] \text{XOR } r[3]b[3] \ldots \text{XOR } r[w]b[w]$ and {r[1], r[2], ..., r[w]} forms a simplex code, if q=1, then $h_1 = H(M(\text{depermute}(z, r[0])) \text{XOR } (K[1]b[1] \text{XOR } K[2]b[2] \text{XOR } K[3]b[3] \ldots \text{XOR } K[w]b[w]), r[0])$ as indication of a successful verification of the identity of said at least one identification device.

11. The method according to claim 9, wherein:

said commitment values are computed as follows:

$$h_1 = H(p), \text{ and}$$

$$h_2 = H(y_p, s[1]_p, \ldots, s[w]_p),$$

where $y_p$ represents the vector y permuted by p, and XOR represents the exclusive OR function;

said third electronic signals are sent to said verification device along with an electronic signal representing a vector $h_0 = M \cdot y$;

said verification device generates a sixth electronic signal representing a randomly selected binary vector b[1] . . ., b[w] and sends said sixth electronic signal to said at least one identification device;

said at least one identification device generates an electronic signal representing a response z as follows:

$z = y_p$ XOR $s[1]_p b[1]$ XOR $s[2]_p b[2]$ XOR $s[3]_p b3]$ . . . XOR $s[w]_p b[w]$ and sends said electronic signal to said verification device;

said random number q is equal to 0 or 1;

said testing carried out in step (i) is carried out as follows:

if q=0, then said identification device generates said fifth electronic signal as a function of vector $y_p$ and vectors $s[1]_p, \ldots, s[w]_p$, and if q=1, then said identification device generates said fifth electronic signal as a function of said second electronic signal, said verification device receives said response r= {r[0], r[1], . . . ,r[w]} if q=0 or r={r[0]} if q=1 and tests that:

if q=0, then $h_2$=H(r),z=r[0]XOR r[1]b[1]XOR, . . . r[2]b[2] XOR r[3]b[3]. . . XOR r[w]b[w] and {r[1], r[2], . . . , r[w]} forms a simplex code, if q=1 then $h_1$=H(r[0]) and $(h_0)r[_0]$XOR (K[1]b[1]XOR K[2]b[2]XOR K[3]b[3]. . . XOR K[w] b[w])$_{r[0]}$=z as indication of a successful verification of the identity of said at least one identification device.

12. The method according to any of claims 1–11, wherein: step (j) comprises repeating steps (a)–(i) t times, where t is an integer; and said verification device authenticates said at least one identification device only if the testing carried out in step (i) is successful each of said t times.

13. The method according to claim 12, wherein 0<t< 60.

14. The method according to claim 13, wherein said Hamming weight d is chosen such that:

$$d \leq (k-n) \cdot \log_2 (1-(k/n)-k \cdot \log_2 (k/n)$$

15. The method according to claim 13, wherein said Hamming weight d is chosen such that:

$$d \geq (n-(k-n) \cdot \log_2 (1-k/n))+k \cdot \log_2 (k/n).$$

16. The method according to claim 14, wherein n=2·k.

17. The method according to claim 14, wherein d=(0.11)·n or d=(0.89)·n.

18. The method according to claim 15, wherein n=2·k.

19. The method according to claim 15, wherein d=(0.11)·n or d=(0.89)·n.

20. The method according to claim 16, wherein one of the following is true:

{n=384, k=196},

{n=512, k=256},

{n=1024, k=512}, or

{n=768, k=384}.

21. The method according to claim 17, wherein one of the following is true:

{n=384, k=196},

{n=512, k=256},

{n=1024, k=512}, or

{n=768, k=384}.

22. The method according to claim 18, wherein one of the following is true:

{n=384, k=196},

{n=512, k=256},

{n=1024, k=512}, or

{n=768, k=384}.

23. The method according to claim 19, wherein one of the following is true:

{n=384, k=196},

{n=512, k=256},

{n=1024, k=512}, or

{n=768, k=384}.

24. The method according to any claims 6–8, wherein $n = k \cdot \ln(m)/\ln 2$ and n−k>64.

25. The method according to claim 24, wherein m is selected from the group consisting of 2, 3, 5, 7, or $2^c$, where c is an integer.

26. The method according to any of claims 6–8, wherein the values of {n, k, m} are one of the following:

{198, 128, 3},

{384, 256, 3},

{128, 64, 5}, or

{192, 96, 5}.

27. The method according to claim 26, wherein H(p) is calculated by calculating H($e_p$), where e is a pseudo-random constant vector.

28. The method according to claim 23, wherein electronic signals representing a set of primary secret codes {K·$P_i$} are selected, and an electronic signal representing a binary vector I=H(ID) is generated to generate an electronic signal representing at least one vector s such that an ID representing the identity of each of said at least one identification device may be associated with the codes {s, K} thereof, where s represents $s_i$ or s[1], . . . , s[w] and K represents $K_i$ or K[1], . . . , K[w], respectively.

29. The method according to claim 28, wherein said verification device determines whether said electronic signal representing at least one vector s is generated as a function of said electronic signals representing secret codes {K·$P_i$}, where s represents $s_i$ or s[1], . . . ,s[w] and K represents $K_i$ or K[1], . . . , K[w], respectively.

30. The method according to claim 29, wherein said set of primary secret codes $\{K \cdot P_i\}$ forms at least one extended simplex code.

31. The method according to claim 30, wherein I is a 56-bit vector.

32. The method according to claim 31, wherein:

$$s = I[1] \cdot (K \cdot P_1) + I[2] \cdot (k \cdot P_2) + \ldots 1 \cdot (K \cdot P_{size\ of\ t})$$

and where $$P \cdot P_i = M \cdot (K \cdot P_i).$$

33. The method according to claim 32, wherein said verification device selects electronic signals representing t primary secret codes $\{K \cdot P_i\}$ with weights a·t and generates an electronic signal representing a code s by partial triangulation as follows:

$$s = \sum_{i=1}^{t} x[i] K \times P_i$$

$$M \times s = \sum_{i=1}^{t} I[i] P \times P_i,$$

where the weight of $s=(t \cdot a)-t/2$, $P \cdot P_i = M \cdot (K \cdot P_i)$ is published, and the choice of dimensions is governed by the following relations:

$(0.11) \cdot n = (t \cdot a) - t/2$, $2 \cdot k = n$ and $(2 \cdot a \cdot t \cdot \epsilon) > 56$ where $(2 \cdot a) - (2 \cdot a \cdot H_2(\epsilon)) = 1$.

34. The method according to claim 33, wherein t=56, d=95, $n=864$, $k=432$.

35. An identity authentication system comprising:
 a verification device; and
 at least one identification device, wherein
  said at least one identification device comprises:
   means for storing an electronic secret key signal representing a secret key comprising at least one vector $s_i$ of dimension n and Hamming weight d, where d, i, and n are integers and d<n;
   means for generating an electronic public key signal representing a public key having a matrix M with dimensions n×k the coefficients of which are chosen at random, where k is an integer;
   means for generating a first electronic signal representing a random vector y of dimension n and a second electronic signal representing a random permutation p;
   means for applying an electronic signal representing a cryptographic hash function H to said first and second electronic signals, said electronic secret key signal, and said electronic public key signal to generate third electronic signals representing commitment values; and
   means for generating an electronic signal representing a response in accordance with an electronic signal representing a random number received from said verification device, and wherein:
  said verification device comprises means for receiving said electronic signal representing a response from said at least one identification device and testing said electronic signal to verify the identity of said at least one identification device.

36. The identity authentication system according to claim 35, wherein said verification device comprises:
 means for storing electronic signals representing at least one public key vector $K_i$ and said Hamming Weight d;
 means for storing said third electronic signals representing commitment values $h_1$, $h_2$, and $h_3$ received from said at least one identification device;
 means for receiving electronic signals representing a response from said at least one identification device and extracting electronic signals representing a permutation p and a vector v consisting of n bits, or electronic signals representing two vectors U and V of n bits each, therefrom;
 means for multiplying said electronic public key signal by an electronic signal representing said vector v;
 means for generating an electronic signal representing a vector w by adding an electronic signal representing a public key vector $K_i$ to an electronic signal representing a result of multiplying M·v;
 means for applying electronic signals representing said permutation p to electronic signals representing said vector v or to electronic signals representing said vectors U and V;
 means for applying said electronic signal representing said cryptographic hash function H to electronic signals representing said permutation p and said vector w or to an electronic signal representing a vector resulting from applying said electronic signal representing said permutation p to electronic signals representing vector v, U, or V;
 means for comparing results of hashing to said third electronic signals representing commitment values $h_1$, $h_2$, and $h_3$;
 means for applying the exclusive OR function to said electronic signals representing vectors U and V; and
 means for generating an electronic signal representing a Hamming Weight of (U XOR V) and comparing said Hamming Weight to the value of d.

37. The identity authentication system according to claim 35, wherein said electronic public key signal is generated by a deterministic pseudo-random number generator.

38. The identity authentication system according to claim 36, wherein said multiplying means comprises:
 a plurality of AND gates, an electronic signal representing a bit from said vector y and an electronic signal representing a bit from a current line of said public matrix M being applied to inputs of each of said AND gates; and
 a triangular network of XOR gates which receive outputs of said AND gates and generate electronic signals representing bits corresponding to a scalar product of said vector y and said current line of said public matrix M.

* * * * *